(12) United States Patent
Vendrow et al.

(10) Patent No.: US 9,042,265 B1
(45) Date of Patent: May 26, 2015

(54) WORKLOAD BALANCING TECHNIQUE FOR A TELEPHONE COMMUNICATION SYSTEM

(75) Inventors: Vlad Vendrow, Redwood Shores, CA (US); Dmitriy Solovey, San Jose, CA (US)

(73) Assignee: Advanced Messaging Technologies, Inc., Los Angeles, CA (US)

( * ) Notice: Subject to any disclaimer, the term of this patent is extended or adjusted under 35 U.S.C. 154(b) by 513 days.

(21) Appl. No.: 13/235,052

(22) Filed: Sep. 16, 2011

(51) Int. Cl.
*H04L 12/28* (2006.01)
*H04L 29/08* (2006.01)
*H04L 12/803* (2013.01)

(52) U.S. Cl.
CPC ........... *H04L 67/1019* (2013.01); *H04L 47/125* (2013.01)

(58) Field of Classification Search
CPC .......................... H04L 47/125; H04L 67/1019
USPC .................................. 370/235, 254, 352, 401
See application file for complete search history.

(56) References Cited

U.S. PATENT DOCUMENTS

| | | | |
|---|---|---|---|
| 6,208,638 B1 | 3/2001 | Rieley et al. | |
| 6,711,159 B1 | 3/2004 | Grabelsky et al. | |
| 6,775,272 B2 | 8/2004 | Galvin et al. | |
| 6,928,477 B1 * | 8/2005 | Leymann et al. | 709/226 |
| 7,012,888 B2 * | 3/2006 | Schoeneberger et al. | 370/217 |
| 7,082,122 B2 * | 7/2006 | Pan | 370/352 |
| 7,496,924 B2 | 2/2009 | Callaghan et al. | |
| 7,724,671 B2 | 5/2010 | Midtun et al. | |
| 7,792,065 B2 * | 9/2010 | Jepson et al. | 370/261 |
| 8,527,639 B1 * | 9/2013 | Liskov et al. | 709/228 |
| 8,654,703 B2 * | 2/2014 | Stewart | 370/328 |
| 2002/0198993 A1 * | 12/2002 | Cudd et al. | 709/225 |
| 2003/0026410 A1 | 2/2003 | Lumsden | |
| 2003/0118004 A1 | 6/2003 | Pan | |
| 2004/0044740 A1 * | 3/2004 | Cudd et al. | 709/217 |
| 2007/0165830 A1 | 7/2007 | Paden et al. | |
| 2009/0271798 A1 | 10/2009 | Iyengar et al. | |
| 2009/0287846 A1 | 11/2009 | Iyengar et al. | |
| 2010/0271947 A1 * | 10/2010 | Abdelal et al. | 370/235 |
| 2011/0075654 A1 * | 3/2011 | Joachimpillai et al. | 370/352 |
| 2011/0130168 A1 | 6/2011 | Vendrow et al. | |

OTHER PUBLICATIONS

Handley, et al. "SIP: Session Initiation Protocol," Internet Engineering Task Force Internet Draft ietf-mmusic-sip-02.txt, Mar. 27, 1997, 39 pages.

* cited by examiner

*Primary Examiner* — Hassan Kizou
*Assistant Examiner* — Abdullahi Ahmed
(74) *Attorney, Agent, or Firm* — Kenyon & Kenyon LLP

(57) ABSTRACT

A workload balancing technique enhances balancing of workloads processed by components of a telephone communication system configured to render telephony services over a computer network. The telephony services illustratively include private branch exchange (PBX) services suitable for customers with geographically dispersed telephone service demands. The workload balancing technique is invoked by the communication system to reduce contention among the components of the system, such as telephone access servers (TASes) coupled to a proxy router, when servicing telephony requests issued by the customers, thus enabling rendering of the telephony services in an efficient and cost-effective manner. As described herein, an available TAS is randomly selected to service a telephony request received by the proxy router from a network coupled to the communication system.

23 Claims, 4 Drawing Sheets

WORKLOAD BALANCING TECHNIQUE FOR A TELEPHONE COMMUNICATION SYSTEM

FIELD OF THE INVENTION

The present invention relates to telephone communication systems and, more specifically, to workload balancing of components of a telephone communication system.

BACKGROUND OF THE INVENTION

A private branch exchange (PBX) is a telephone system typically owned and operated by a business organization or enterprise. The PBX typically provides services, such as switching of telephone calls, conference calls, call forwarding and voice mail, to users of the enterprise. Recent advances in technology have resulted in the provision of high-availability and reliable computing being delivered as a service to the users of the enterprise. A telephone communication system may be configured to provide such computing ("cloud computing") to render telephony services, including those provided by a PBX, to its users (customers) over a computer network. The customers may be dispersed throughout many geographical regions and, as such, may present certain challenges or demands to delivery of these telephony services. To that end, the telephone communication system may include a plurality of geographically dispersed components organized to efficiently service telephony requests, such as telephone calls, issued by the customers.

However, contention among the components to service the telephony requests may introduce imbalances in the telephone communication system, thereby adversely affecting the performance of the system. For instance, the processing load (i.e., workload) on one or more of the components may become imbalanced due to, e.g., the component receiving an increased number of requests to render the telephony services. The increased number of requests may be attributed to location-based factors, such as proximity of the component to a customer issuing the telephony request, e.g., a local component geographically situated relatively close to the customer may have the benefit of a shorter distance to receive and respond to the requests than a remote component situated relatively far away from the customer. In addition, imbalances in the workload of the components may be attributed to network infrastructure-based factors, such as the available bandwidth (or lack thereof) during business hours of the enterprise. The workload imbalance may adversely affect the processing performance of the component, e.g., by creating a "hot-spot" in the system which, in turn, may result in decreased telephony service performance of the telephone communication system.

SUMMARY OF THE INVENTION

The present invention provides a technique that enhances balancing of workloads processed by components of a telephone communication system configured to render telephony services over a computer network. The telephony services illustratively include private branch exchange (PBX) services suitable for customers with is geographically dispersed telephone service demands. The workload balancing technique is invoked by the communication system to reduce contention among the components of the system when servicing telephony requests issued by the customers, thus enabling the rendering of the telephony services in an efficient and cost-effective manner.

According to one or more embodiments described herein, the components of the telephone communication system include computer nodes executing software processes and/or services embodied as telephone access servers (TASes) coupled to one or more proxy routers via proxy servers. The proxy servers are illustratively configured to provide operational status monitoring services to select one or more TASes configured to provide the telephony services and, to that end, may maintain a database indicating an operational status, e.g., available or unavailable, of each TAS. However, the embodiments described herein are not so limited, and may, in fact, be used without the proxy servers and their interposition between the TASes and proxy router. An available TAS is randomly selected to service a telephony request received by the proxy router from a telephone network, such as a packet switched telephone network (PSTN), coupled to the communication system.

In response to receiving the telephony request, the proxy router illustratively transmits a capability message to all of the proxy servers of the telephone communication system. According to a first aspect of the workload balancing technique, the first proxy server to respond to the capability message is selected by the proxy router to receive an invitation to participate in the servicing of the telephony request. The proxy router illustratively waits for expiration of a configurable period of time ("time-out period") to receive responses from the proxy servers. Notably, each proxy server is configured to respond to the capability message after a randomized delay to thereby facilitate reduction in contention among the proxy servers. The proxy router then transmits an invite message to the selected ("first responding") proxy server. The remaining proxy servers do not receive invitations and therefore do not participate in the servicing of the telephony request. If none of the proxy servers respond within the time-out period, the is proxy router drops the request, i.e., the request is not serviced by any other component of the communication system.

Upon receiving a successful response to the invite message, the proxy router forwards the telephony request to the selected proxy server, which queries the database for a listing of available TASes. According to a second aspect of the workload balancing technique, if there are no TASes listed as available to service the telephony request, the proxy server drops the request. However if there are TASes listed as available to service the request, the proxy server randomly selects a subset of the available TASes to receive a capability message to thereby facilitate reduction in contention among the TASes. The first TAS to respond to the capability message is selected by the proxy server to receive an invitation to participate in the servicing of the telephony request. The proxy server illustratively waits for expiration of a configurable time-out period to receive responses from the TASes. Notably, each available TAS is configured to respond to the capability message after a randomized delay to thereby further facilitate reduction in contention among the TASes. The proxy server then transmits an invite message to the first responding TAS. The remaining available TASes do not receive invitations and therefore do not participate in the servicing of the telephony request. If none of the available TASes respond within the time-out period, the proxy server drops the request. The proxy server thereafter forwards the telephony request to the selected TAS for servicing of the request upon receiving a successful response to the invite message.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
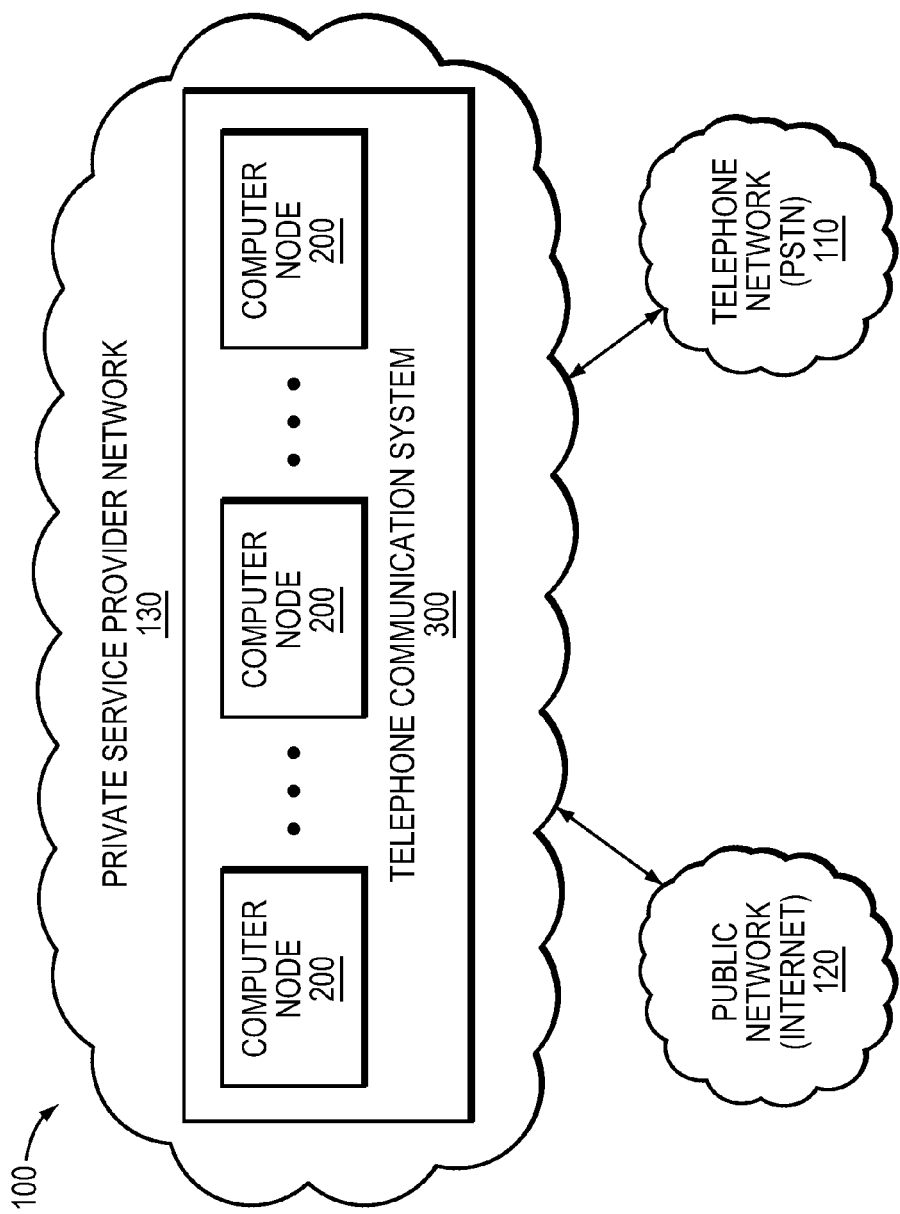
FIG. 1 is a schematic block diagram of a network environment that may be advantageously used with the present invention.

FIG. 1 is a schematic block diagram of a network environment 100 that may be advantageously used with the present invention. The network environment 100 illustratively includes a telephone network 110 coupled to computer networks organized as a public network 120, such as the Internet, and a private service provider network 130. The telephone network 110 is illustratively a circuit switched network, such as the public switched telephone network (PSTN), configured to provide local and long-distance telephone call service through one or more telephone companies. Customarily, users of a business organization or enterprise may access the telephone network 100 using a private branch exchange (PBX) typically owned and operated by the enterprise. The PBX is a telephone system that provides telephony services, such as switching of telephone calls, conference calls, call forwarding and voice mail, to the users of the enterprise.

The computer networks 120, 130 are illustratively packet switched networks that include a plurality of network links and segments connected to a plurality of nodes, such computer nodes and intermediate nodes. The network links and segments may include local area networks (LANs) and wide area networks (WANs) interconnected by intermediate nodes, such routers, to form an internetwork of nodes. These internetworked nodes illustratively communicate by exchanging packets or messages according to a predefined set of protocols, such as the Transmission Control Protocol/Internet Protocol (TCP/IP) and Session Initiation Protocol (SIP), although it should be noted that other protocols, such as the HyperText Transfer Protocol (HTTP), may be advantageously used with the present invention.

The private service provider network 130 may include a plurality of computer nodes 200 organized as a telephone communication system 300 that is configured to is render the telephony services provided by a PBX over a computer network, such as the Internet. In addition, the computer nodes 200 may be geographically dispersed to accommodate the telephony service demands of customers of the telephone communication system 300. As a result, the private service provider network 130 may subscribe to one or more Internet service providers (ISP) that typically own a plurality of backbone networks that may be used to interconnect the geographically dispersed nodes of the telephone communication system and/or provide high-speed connectivity to the Internet.

Figure 2:
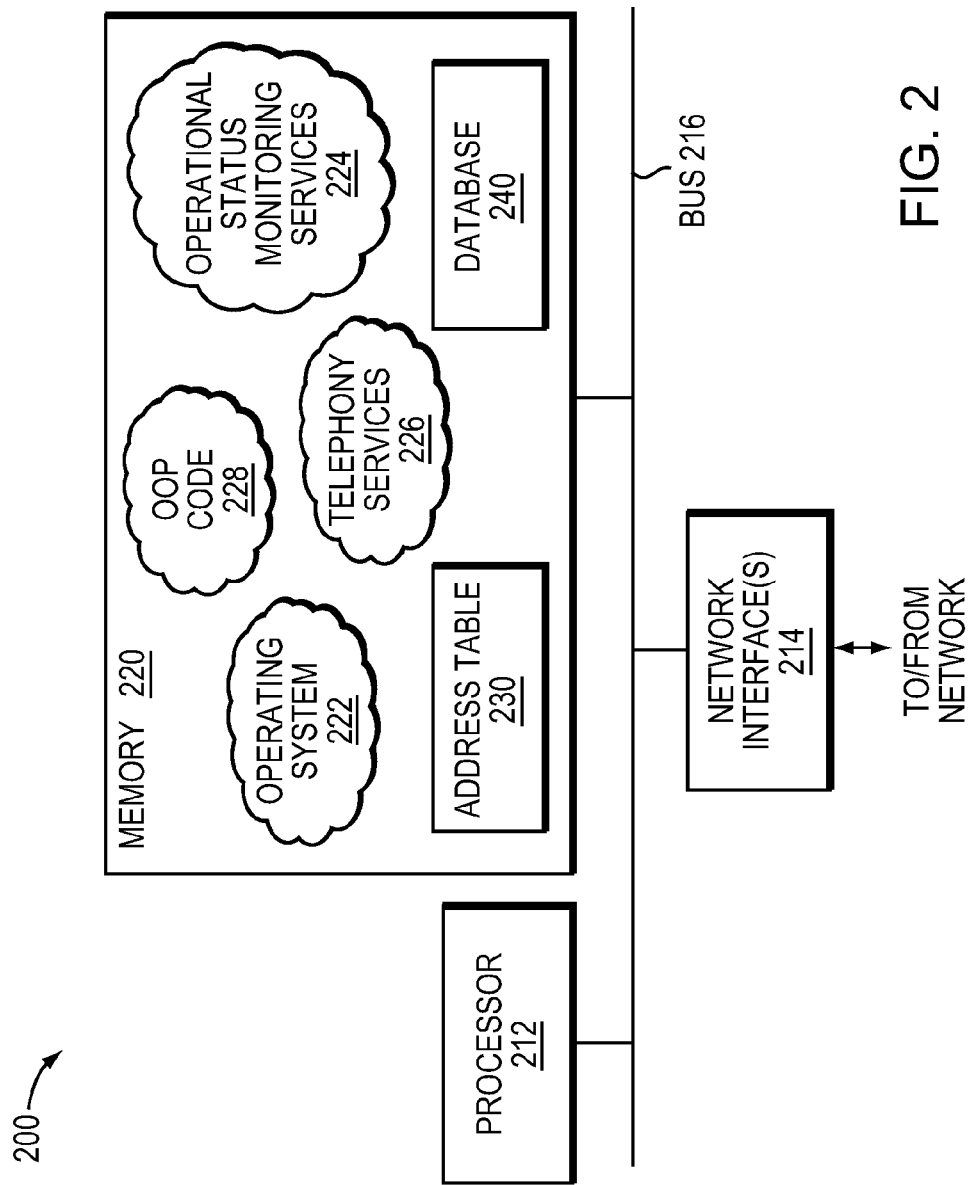
FIG. 2 is a schematic block diagram of a computer node that may be advantageously used with the present invention.

FIG. 2 is a schematic block diagram of a computer node 200, e.g., a general-purpose computer, that may be advantageously used with the present invention. The node 200 illustratively comprises a processor 212, a memory 220 and one or more network interfaces 214 interconnected by a system bus 216. Each network interface 214 contains the mechanical, electrical and signaling circuitry needed to connect the node to the networks to thereby facilitate communication over the networks. To that end, the network interface 214 may be configured to transmit and/or receive messages using a variety of communication protocols including, inter alia, TCP/IP, SIP and HTTP.

The memory 220 comprises a plurality of locations that are addressable by the processor 212 and the network interfaces 214 for storing software program code and data structures associated with the embodiments described herein. The processor 212 may comprise necessary elements or logic adapted to execute the software program code, such as object-oriented programming (OOP) code 228, and manipulate the data structures, such as address table 230 and database 240. An operating system 222 (e.g., a Unix or Windows operating system), portions of which are typically resident in memory 220 and executed by the processor, functionally organizes the node by, inter alia, invoking operations in support of software processes and/or services executing on the node. These software processes/services may comprise operational status monitoring services 224 and telephony services 226 as described herein. It will be apparent to those skilled in the art that other types of processors and memory, including various computer-readable media, is may be used to store and execute program instructions pertaining to the technique described herein. Also, while the embodiments herein are described in terms of software processes/services stored in memory, alternative embodiments also include those processes/services being embodied as modules consisting of hardware, software, firmware, or combinations thereof.

As noted, a telephone communication system may be configured to render telephony services, such as those provided by a PBX, to its customers over a computer network. The customers may be dispersed throughout many geographical regions and may present certain challenges or demands to delivery of these telephony services. To that end, the telephone communication system may include a plurality of geographically dispersed components organized to efficiently service telephony requests, such as telephone calls, issued by the customers. However, contention among the components to service the telephony requests may introduce workload imbalances in the telephone communication system, thereby adversely affecting the performance of the system.

Workload Balancing Technique

The present invention provides a technique that enhances balancing of workloads processed by components of a telephone communication system configured to render telephony services over a computer network. The telephony services illustratively include PBX services suitable for customers with geographically dispersed telephone service demands. The workload balancing technique is invoked by the communication system to reduce contention among the components of the system when servicing telephony requests issued by the customers, thus enabling rendering of the telephony services in an efficient and cost-effective manner.

Figure 3:
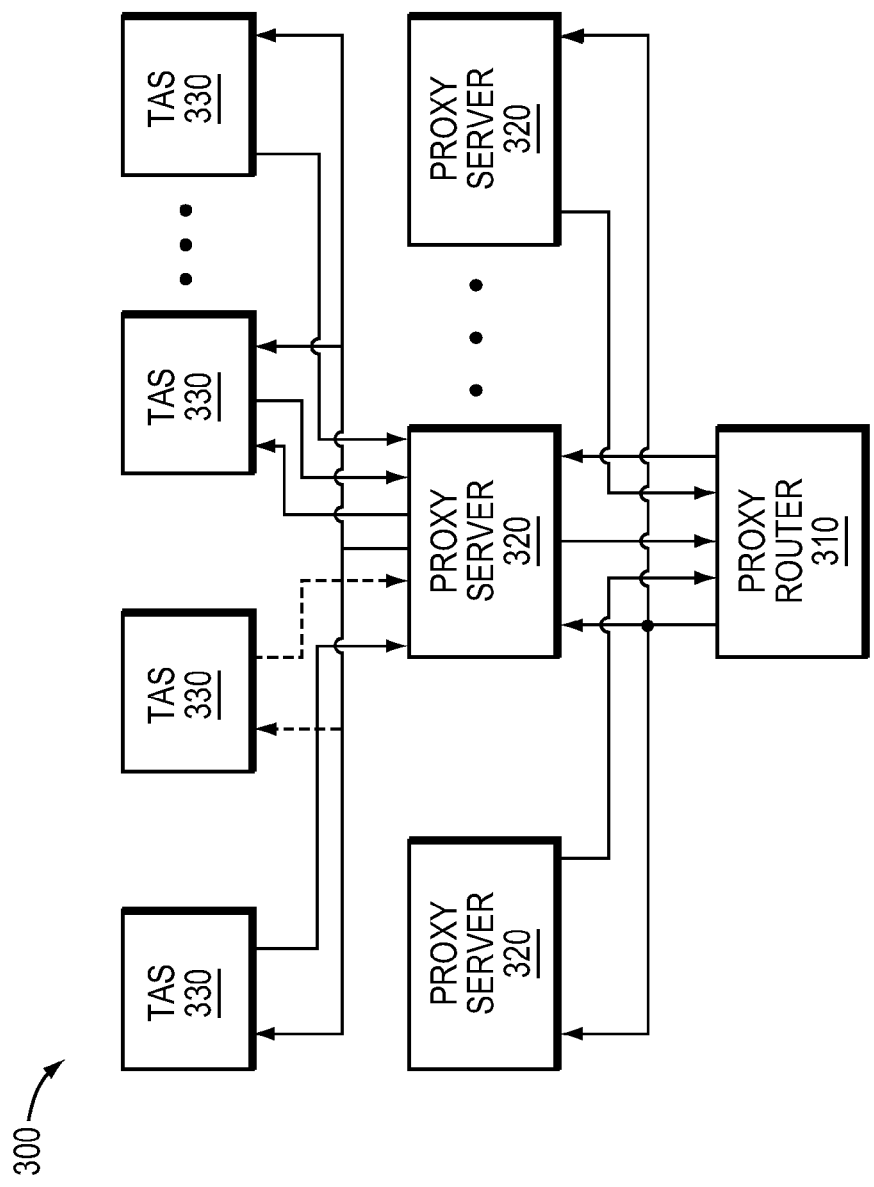
FIG. 3 is a schematic block diagram of a telephone communication system that may be advantageously used with the present invention.

FIG. 3 is a schematic block diagram of the telephone communication system 300 that may be advantageously used with the present invention. According to one or more embodiments described herein, the components of the telephone communication system 300 include computer nodes 200 executing software processes and/or services embodied as telephone access servers (TASes 330) coupled to one or more proxy routers 310 via is proxy servers 320. The proxy servers 320 are illustratively configured to provide the operational status monitoring services to select one or more TASes configured to provide the telephony services. Accordingly, each proxy server 320 maintains database 240 indicating, inter alia, an operational status, e.g., available or unavailable, of each TAS 330.

Operational status monitoring services 224 contain computer executable instructions executed by processor 212 to perform functions provided by one or more proxy servers 320. These functions may be configured to manage the database 240 containing, e.g., information pertaining to the operational status of the TASes 330. Changes in the operational status of the TASes may be communicated among proxy servers 320 using, e.g., heartbeat signaling in accordance with a request/response message exchange of the predefined protocols. In an illustrative embodiment, each proxy server 320 maintains listings of TASes in database 240 that are available ("$TAS_{alive}$") and unavailable ("$TAS_{blacklist}$"). A TAS is either available or unavailable at any point in time. If the $TAS_{blacklist}$ list≠0, i.e., there are TASes in the communication system that are unavailable to service telephony requests, the proxy server may periodically send heartbeat signal messages (at a configurable frequency) to every unavailable TAS on the $TAS_{blacklist}$ list. The proxy server may then await a heartbeat response within a configurable period of time, up to a maximum period (e.g., in milliseconds). If a TAS responds to the message within the configurable period of time, the TAS is removed from the $TAS_{blacklist}$ list and added to the $TAS_{alive}$ list.

Telephony services 226 contain computer executable instructions executed by processor 212 to perform functions provided by one or more TASes 330. Illustratively, these functions may configure each TAS to emulate a softswitch to enable rendering of the telephony services such as switching of telephone calls, conference calls, call forwarding and voice mail, to the customers of the telephone communication system 300. The telephony services are preferably rendered in accordance with a rule-based processing architecture wherein processing of a particular telephony service request is defined and controlled by program code or logic that associates a rule with the requested service. As described herein, an available TAS is randomly selected to service a telephony request received by the proxy router 310 from telephone network 110, such as a PSTN, coupled to the communication system 300 in accordance with the workload balancing technique.

Operationally, in response to receiving the telephony request, the proxy router 310 transmits a capability message, preferably simultaneously, to all of the proxy servers 320 of the telephone communication system. Each proxy router illustratively maintains addresses, e.g., IP addresses, for all proxy servers 320. The IP addresses may be maintained in a data structure, such as address table 230 in memory 220. In an illustrative embodiment, each proxy router 310 may be further embodied as an Inbound SIP Router (ISR) configured to implement the SIP protocol, while each proxy server 320 may be embodied as an Inbound SIP Proxy server (ISP) also configured to implement the SIP protocol. The SIP protocol is well-known and described in more detail in Internet Engineering Task Force (IETF) Internet Draft publication, entitled "SIP: Session Initiation Protocol," ietf-mmusic-sip-02.txt, dated Mar. 27, 1997. The capability message described herein is preferably a custom protocol built on top of TCP/IP that allows the proxy router to query the availability of the proxy server. This could be, for example, a text-based request/response protocol built on top of TCP/IP where the proxy router sends a text request asking whether the proxy server is alive, and the proxy server can send a text response indicating, inter alia, whether it is alive, has no free resources or is in an invalid state. As another embodiment, the capability message may be a SIP Options message (or similar SIP message) upon the SIP protocol. However, those skilled in the art will understand that other messaging protocols, such as HTTP, Simple Mail Transfer Protocol (SMTP), Post Office Protocol 3 (POP3) and/or Simple Object Access Protocol (SOAP), may be advantageously used with the present invention.

According to a first aspect of the workload balancing technique, the first proxy server to respond to the capability message is selected by the proxy router 310 to receive an invitation (e.g., an invite message) to participate in the servicing of the telephony request. The invite message is intended to establish a session for servicing of the telephony request. In an illustrative embodiment, the invite message is preferably a SIP Invite message (or similar SIP message) under the SIP protocol, although other messaging protocols, such as HTTP, SMTP, POP3, SOAP and/or proprietary protocols, may be advantageously used with the present invention. The proxy router illustratively waits for expiration of a configurable period of time ("time-out period") to receive responses from the proxy servers. Notably, each proxy server 320 is configured to respond to the capability message after a randomized delay to thereby facilitate reduction in contention among the proxy servers. The proxy router 310 then transmits the invite message to the selected ("first responding") proxy server. The remaining proxy servers do not receive invitations and therefore do not participate in the servicing of the telephony request. If none of the proxy servers respond within the time-out period, the proxy router drops the request, i.e., the request is not serviced by any other component of the communication system.

In an illustrative embodiment, the randomized delay configured on each proxy server 320 may be realized using a random number generation (RNG) function of OOP code 228, such as C++, executable by processor 212. The RNG function, e.g., RNG (x,y), preferably produces values between x and y, inclusive, with an (ideally) uniform probability distribution and appearance of randomness or white noise. The RNG function parameters x and y are illustratively dependent upon the environment within which the invention operates. That is, the parameters are illustratively dependent upon the operating environment of the telephone communication system. For example, in an environment wherein the geographically dispersed computer nodes 200 are embodied as five (5) proxy servers of telephone communication system 300 (e.g., as further indicated in database 240), each proxy server 320 may be configured to respond to the capability message after a randomized period between x=1 and y=5 (e.g., in milliseconds, although the units of time may be substantially longer or shorter orders of magnitude), inclusive. In other words, each proxy server may be configured to wait for RNG (1,5), i.e., a random period of time between 1 and 5 inclusive, before responding to the capability message. Illustratively, the parameters of the RNG function may be provided to each proxy server by the proxy router (e.g., either separately or as part of the messaging protocol) and used to compute the randomized delay configured on the proxy server for each invitation, although other time periods may also be advantageously employed.

Upon receiving a successful response to the invite message, the proxy router 310 forwards the telephony request to the selected proxy server 320, which queries the database 240 for a listing of available TASes. According to a second aspect of the workload balancing technique, if there are no TASes listed as available to service the telephony request, i.e., $TAS_{alive}$ list=0, the proxy server drops the request. However if there are TASes listed as available to service the request, i.e., $TAS_{alive}$ list≠0, the proxy server randomly selects a subset, e.g., three (3), of the available TASes to receive a capability message, e.g., a custom TCP/IP-based request/response messaging protocol or a SIP Options message, to thereby facilitate reduction in contention among the TASes. It should be noted that this subset of available TASes may include all of the available TASes (i.e., the subset does not need to be a "proper subset" as understood under set theory). Here, the random selection of available TASes may be realized using the RNG function with the x and y parameters defined by the number of available TASes indicated in database 240. For example, if there are eight (8) TASes listed as available to service the request, the proxy server may sequentially assign each of the eight available TASes a number between 1 and 8. The proxy server may then invoke the RNG function to retrieve a predetermined number of unique random values, e.g., three (3) unique values, between x=1 and y=8. That is, the proxy server may retrieve the first, second and third unique random values returned by the function, whereby the retrieved values identify the three TASes selected to receive the capability message. Illustratively, the parameters of the RNG function may be used by the proxy server to compute the randomized selection for each capability message transmission, although other frequencies may also be advantageously employed.

The first TAS 330 to respond to the capability message is selected by the proxy server 320 to receive an invitation to participate in the servicing of the telephony request. The proxy server illustratively waits for expiration of a configurable time-out period to receive responses from the TASes. Notably, each available TAS is configured to respond to the capability message after a randomized delay to thereby further facilitate reduction is in contention among the TASes. The randomized delay configured on each TAS may again be realized using the RNG function with the x and y parameters illustratively dependent upon the environment. For example, in an environment wherein a subset of three (3) TASes is randomly selected to receive the capability message, each TAS 330 may be configured to respond to the message after a randomized period between x=1 and y=3 (e.g., in milliseconds, although the units of time may be substantially longer or shorter orders of magnitude), inclusive. In other words, each TAS may be configured to wait for RNG (1,3), i.e., a random period of time between 1 and 3 inclusive, before responding to the capability message. Illustratively, the parameters of the RNG function may be provided to each TAS by the proxy server (e.g., either separately or as part of the messaging protocol) and used to compute the randomized delay configured on the TAS for each capability message reception, although other frequencies may also be advantageously employed. The proxy server then transmits an invite message, e.g., a SIP Invite message (or similar SIP message), to the first responding TAS. The remaining available TASes do not receive invitations and therefore do not participate in the servicing of the telephony request. If none of the available TASes respond within the time-out period, the proxy server drops the request. The proxy server thereafter forwards the telephony request to the selected TAS for servicing of the request upon receiving a successful response to the invite message. By way of illustration, responses to the invite message may include classes of responses defined in the SIP protocol, such as the 2xx class of responses for accepting an invitation. Optionally, if the selected TAS becomes unable to process the telephony request, the proxy server may drop the request and add that TAS to the $TAS_{blacklist}$ list.

Figure 4:
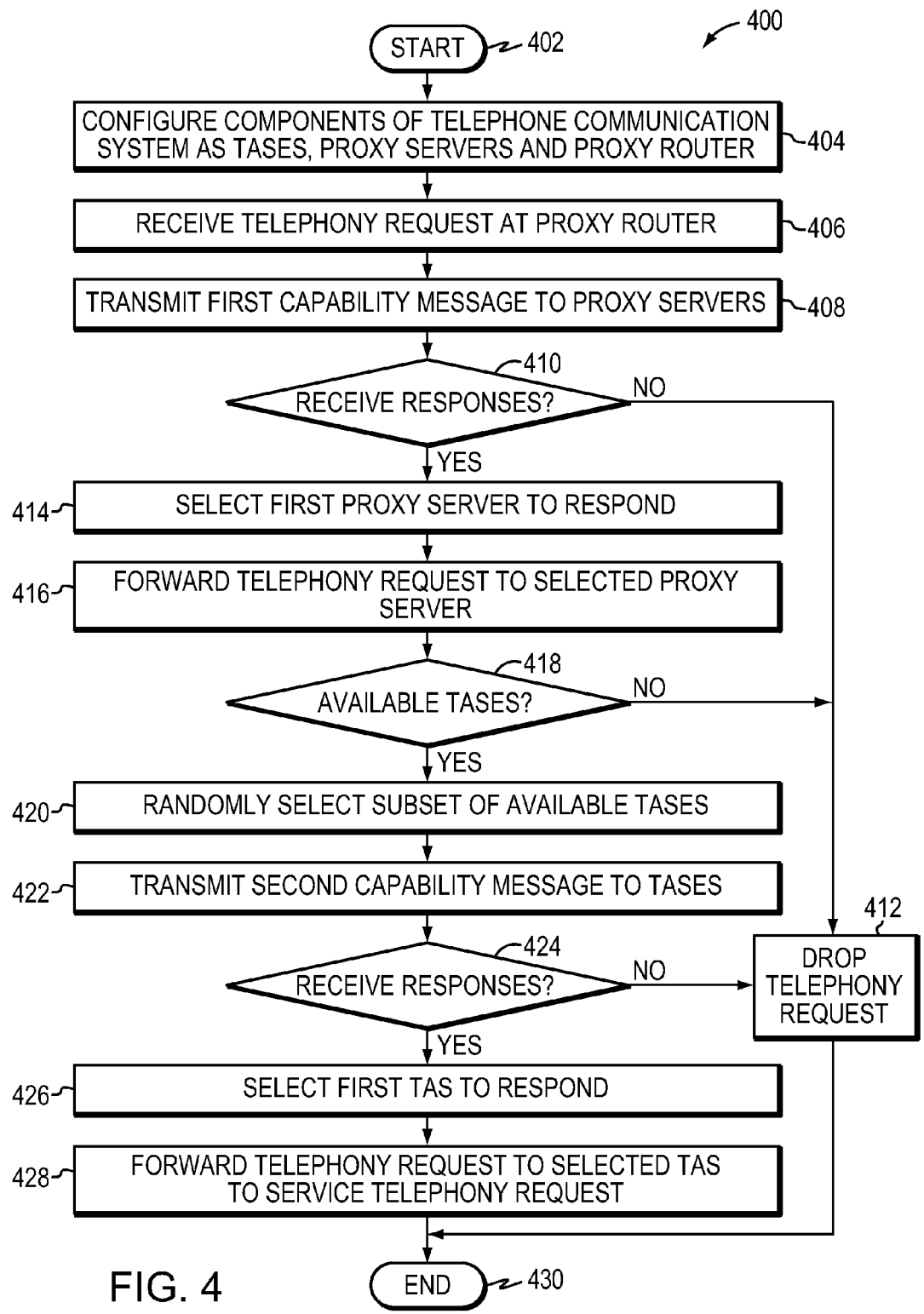
FIG. 4 is a flowchart illustrating a simplified procedure for a workload balancing technique of the present invention.

FIG. 4 is a flowchart illustrating a simplified procedure 400 for a workload balancing technique of the present invention. The procedure starts at step 402 and proceeds to step 404 where a plurality of components of the telephone communication system are configured to render telephony services over a computer network, wherein the components include a plurality of TASes coupled to a proxy router via a plurality of proxy servers. Illustratively, the proxy servers are configured to provide operational status monitoring services and the TASes are configured to provide telephony services for a telephony request received by the telephone communication system. In step 406, the telephony request is received by the proxy router from a telephone network coupled to the communication system and, in response, the proxy router transmits a first capability message to the proxy servers in step 408.

In step 410, the proxy router waits for expiration of a time-out period to receive responses from the proxy servers. If none of the proxy servers respond within the time-out period, the proxy router drops the request in step 412. However, if one or more of the proxy servers respond within the time-out period, in step 414, the proxy router selects a first proxy server to respond to the first capability message to receive a first invitation to service the telephony request. In step 416, the proxy router forwards the telephony request to the selected proxy server upon receiving a first successful response to the first invitation. In step 418, the selected proxy server determines whether there are any TASes available to service the telephony request and if there are none, drops the request in step 412. However if there are TASes available to service the request, in step 420, the selected proxy server randomly selects a subset of the available TASes to receive a second capability message and, in step 422, transmits the second capability message to these TASes. In step 424, the selected proxy server waits for expiration of the time-out period to receive responses from the subset of available TASes. If none of the available TASes respond within the time-out period, the proxy server drops the telephony request in step 412. However, if one or more TASes respond within the time-out period, in step 426, the proxy server selects a first TAS to respond to the second capability message to receive a second invitation to service the telephony request. In step 428, the proxy server forwards the telephony request to the selected TAS for servicing upon receiving a second successful response to the second invitation. The procedure then ends in step 430.

The workload balancing technique described herein may be advantageously implemented in a variety environments. For example, the technique may be implemented in an environment, such as a business organization or enterprise, that is itself a customer, e.g., a consumer, of the telephony services, including those provided by a PBX. In addition, the workload balancing technique may be implemented in an environment, such as a telephony service provider, which provides cloud-based telephony services to customers, e.g., subscribers, that purchase the services for delivery over a network.

Advantageously, the workload balancing technique described herein reduces contention among the components of the telephone communication system when attempting to service telephony requests issued by customers of the system. Specifically, the technique reduces the possibility of workload imbalances in the telephone communication system that may arise when one or more components receive an increased number of requests to render telephony services. The increased number of requests may be attributed to location-based factors, such as proximity of the component to a customer issuing the telephony request, or network-based factors. By reducing contention and any resulting workload imbalances among the components of the system, the workload balancing technique enables rendering of the telephony services in an efficient and cost-effective manner.

While there have been shown and described illustrative embodiments that enhance balancing of workloads processed by components of a telephone communication system configured to render telephony services in a computer network, it is to be understood that various other adaptations and modifications may be made within the spirit and scope of the embodiments herein. For example, the embodiments have been shown and described herein with relation to components of the telephone communication system embodied as TASes coupled to one or more proxy routers via proxy servers. However, the embodiments in their broader sense are not so limited, and may, in fact, be used without the proxy servers 320 and their interposition between the TASes and proxy router.

According to this alternate embodiment of the invention, the proxy router 310 may be configured to provide the operational status monitoring services described herein to thereby select one or more TASes 330 configured to provide the telephony services. The proxy router 310 may be configured to send a capability message to all TASes and to select the first responding TAS to receive an invitation to participate in the servicing of the telephony request as described herein. In an alternative embodiment, the proxy router may be configured to send the invitation only to a randomly-selected subset of TASes that are known to be available. As such, the proxy router may be configured to maintain the database 240 indicating the availability or unavailability of each TAS. In addition, the proxy router 310 may be configured to route a telephony request on a random basis to a TAS, wherein the random basis involves the selection of the TAS from the available TASes. That is, the proxy router may be configured to randomly select a subset of the available TASes to receive a capability message and to select the first responding TAS to receive an invitation to participate in the servicing of the telephony request as also described herein. The proxy router thereafter forwards the telephony request to the selected TAS for servicing upon receiving a successful response to the invitation.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
configuring a plurality of components of a telephone communication system to render telephony services over a computer network, wherein the components include a plurality of telephone access servers (TASes) coupled to a proxy router via a plurality of proxy servers;
in response to receiving a telephony request from a telephone network coupled to the communication system, transmitting a first capability message from the proxy router to the proxy servers;
selecting a first proxy server to respond to the first capability message to receive a first invitation to service the telephony request;
forwarding the telephony request to the selected proxy server upon receiving a first response to the first invitation;
randomly selecting a subset comprising a plurality of the TASes to receive a second capability message transmitted by the selected proxy server;
selecting a first TAS to respond to the second capability message to receive a second invitation to service the telephony request; and
forwarding the telephony request to the selected TAS.

2. The method of claim 1 wherein transmitting the first capability message comprises:
waiting for expiration of a time-out period to receive responses from the proxy servers; and
if none of the proxy servers respond within the time-out period, dropping the telephony request.

3. The method of claim 2 wherein waiting comprises:
configuring each proxy server to respond to the first capability message after a randomized delay.

4. The method of claim 3 wherein configuring each proxy server comprises:
using a random number generation (RNG) function to realize the randomized delay, wherein parameters of the RNG function are dependent upon an operating environment of the telephone communication system.

5. The method of claim 1 wherein forwarding the telephony request to the selected proxy router comprises:
determining whether there are TASes available to service the telephony request; and
if there are no available TASes, dropping the telephony request.

6. The method of claim 5 wherein determining comprises:
maintaining a database indicating an operational status of each TAS.

7. The method of claim 1 wherein randomly selecting the subset of TASes comprises:
using a random number generation (RNG) function to realize the random selection of TASes, wherein parameters of the RNG function are defined by a number of available TASes.

8. The method of claim 1 wherein randomly selecting the subset of TASes comprises:
waiting for expiration of a time-out period to receive responses from the subset of available TASes; and
if none of the available TASes respond within the time-out period, dropping the telephony request.

9. The method of claim 8 wherein waiting comprises:
configuring each available TAS to respond to the second capability message after a randomized delay.

10. The method of claim 9 wherein configuring each available TAS comprises:
using a random number generation (RNG) function to realize the randomized delay, wherein parameters of the RNG function are dependent upon an operating environment of the telephone communication system.

11. The method of claim 1 wherein configuring the plurality of components comprises:
configuring the proxy servers to provide operational status monitoring services; and
configuring the TASes to provide the telephony services.

12. The method of claim 1 wherein configuring the plurality of components comprises:
embodying computers executing software code, processes and services as the TASes, the proxy servers and the proxy router.

13. The method of claim 1 wherein forwarding the telephony request to the selected TAS comprises:

forwarding the telephony request to the selected TAS for servicing of the request upon receiving a response to the second invitation.

14. A system comprising:
a plurality of computer nodes embodied as telephone access servers (TASes) coupled to a proxy router via proxy servers, each computer node having a network interface coupled to a network and a memory configured to store software executable by the computer node, the software when executed operable to:
 transmit a first capability message from the proxy router to the proxy servers in response to receiving a telephony request from the network;
 select a first proxy server to respond to the first capability message to receive a first invitation to service the telephony request;
 forward the telephony request to the selected proxy server upon receiving a first response to the first invitation;
 randomly select a subset comprising a plurality of the TASes to receive a second capability message transmitted by the selected proxy server;
 select a first TAS that responds to the second capability message to receive a second invitation to service the telephony request; and
 forward the telephony request to the selected TAS for servicing of the request upon receiving a response to the second invitation.

15. The system of claim 14 wherein the software when executed to transmit the first capability message is further operable to:
 wait for expiration of a time-out period to receive responses from the proxy servers; and
 if none of the proxy servers respond within the time-out period, drop the telephony request.

16. The system of claim 15 wherein the software when executed to wait is further operable to:
 configure each proxy server to respond to the first capability message after a randomized delay.

17. The system of claim 16 wherein the software when executed to configure each proxy server is further operable to:
 use a random number generation (RNG) function to realize the randomized delay, wherein parameters of the RNG function are dependent upon an operating environment of the system.

18. The system of claim 14 wherein the software when executed to forward the telephony request is further operable to:
 determine whether there are any TASes available to service the telephony request; and
 if there are no available TASes, drop the telephony request.

19. The system of claim 14 wherein the software when executed to randomly select the subset of TASes is further operable to:
 use a random number generation (RNG) function to realize the random selection of TASes, wherein parameters of the RNG function are defined by a number of available TASes.

20. The system of claim 14 wherein the software when executed to randomly select the subset of TASes is further operable to:
 wait for expiration of a time-out period to receive responses from the subset of available TASes; and
 if none of the available TASes respond within the time-out period, drop the telephony request.

21. The system of claim 14 wherein the network interface comprises:
 mechanical, electrical and signaling circuitry to connect the node to the network.

22. A method comprising:
 configuring a plurality of components of a telephone communication system to render telephony services over a computer network, wherein the components include a plurality of telephone access servers (TASes) coupled to a proxy router;
 in response to receiving a telephony request from a telephone network coupled to the communication system, determining whether there are TASes available to service the telephony request and, if there are no available TASes, dropping the telephony request;
 if there are available TASes, transmitting a capability message from the proxy router to a subset comprising a plurality of the available TASes;
 waiting for expiration of a time-out period to receive responses from the subset of available TASes and, if none of the available TASes respond within the time-out period, dropping the telephony request;
 selecting a first TAS to respond to the capability message to receive an invitation to service the telephony request; and
 forwarding the telephony request to the selected TAS for servicing of the request upon receiving a response to the invitation.

23. The method of claim 22 wherein transmitting the capability message comprises:
 randomly selecting the subset of the available TASes to receive the capability message transmitted by the proxy router.

* * * * *